Dec. 8, 1925.
A. P. WINTER
1,564,920
VEHICLE DUMP
Filed April 17, 1925   3 Sheets-Sheet 3
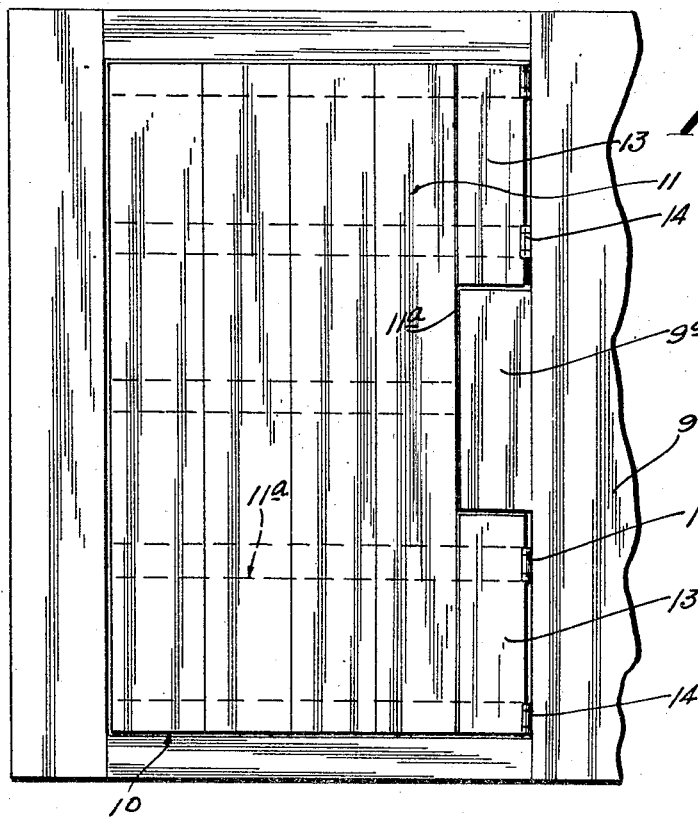
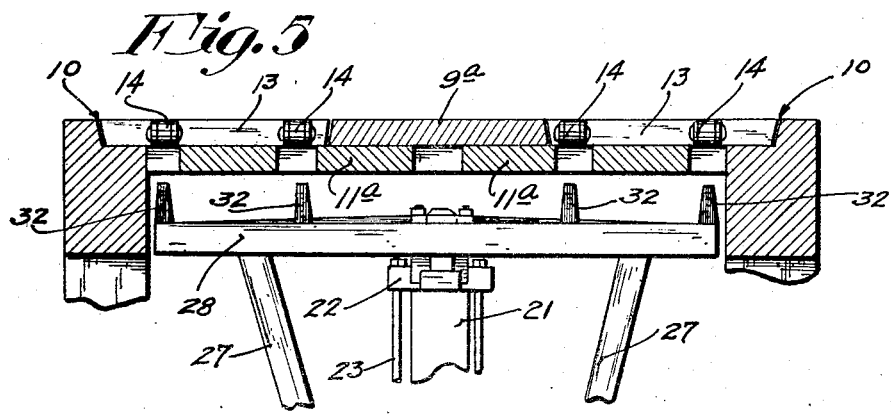
Inventor
August P. Winter
By his Attorneys Patented Dec. 8, 1925.

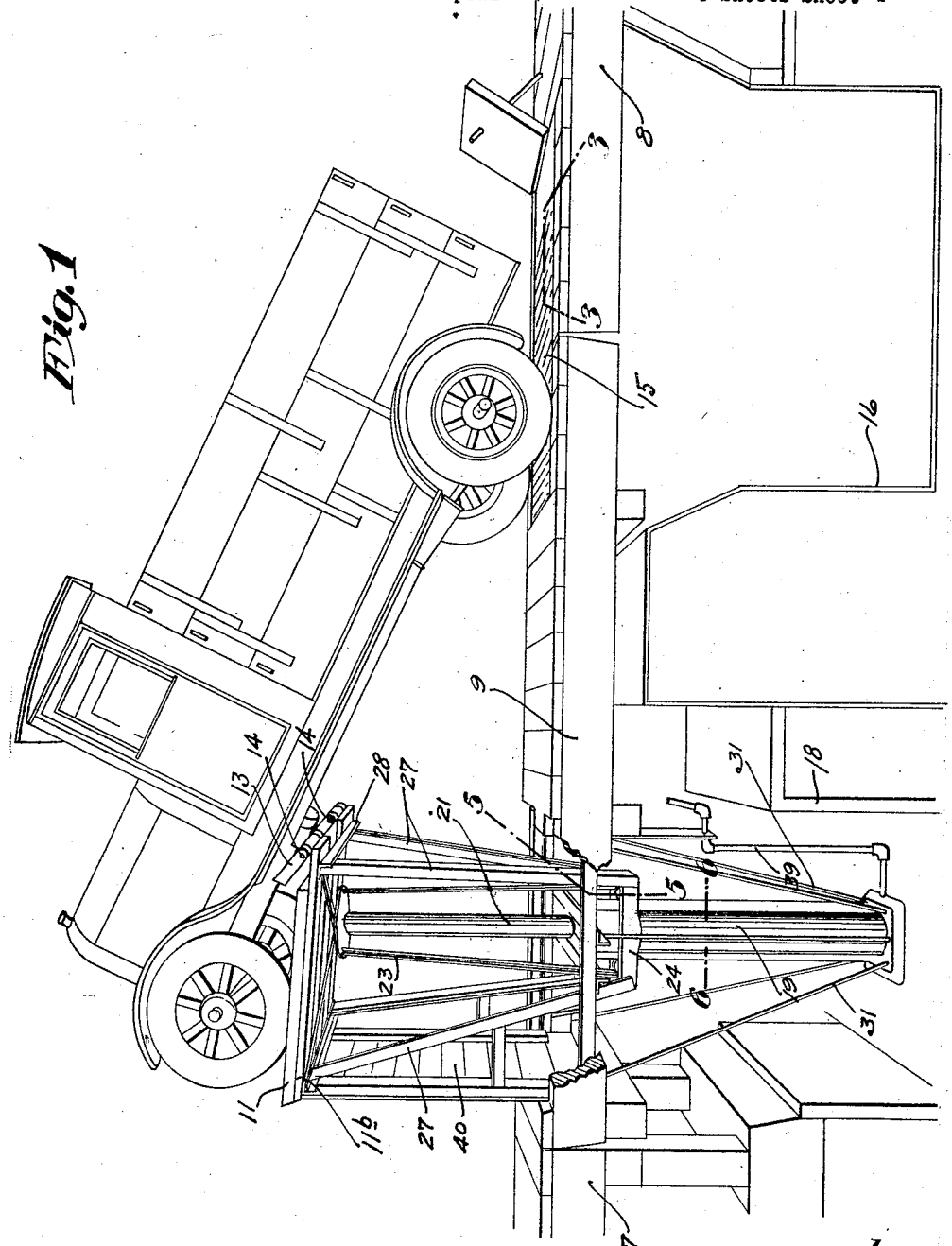

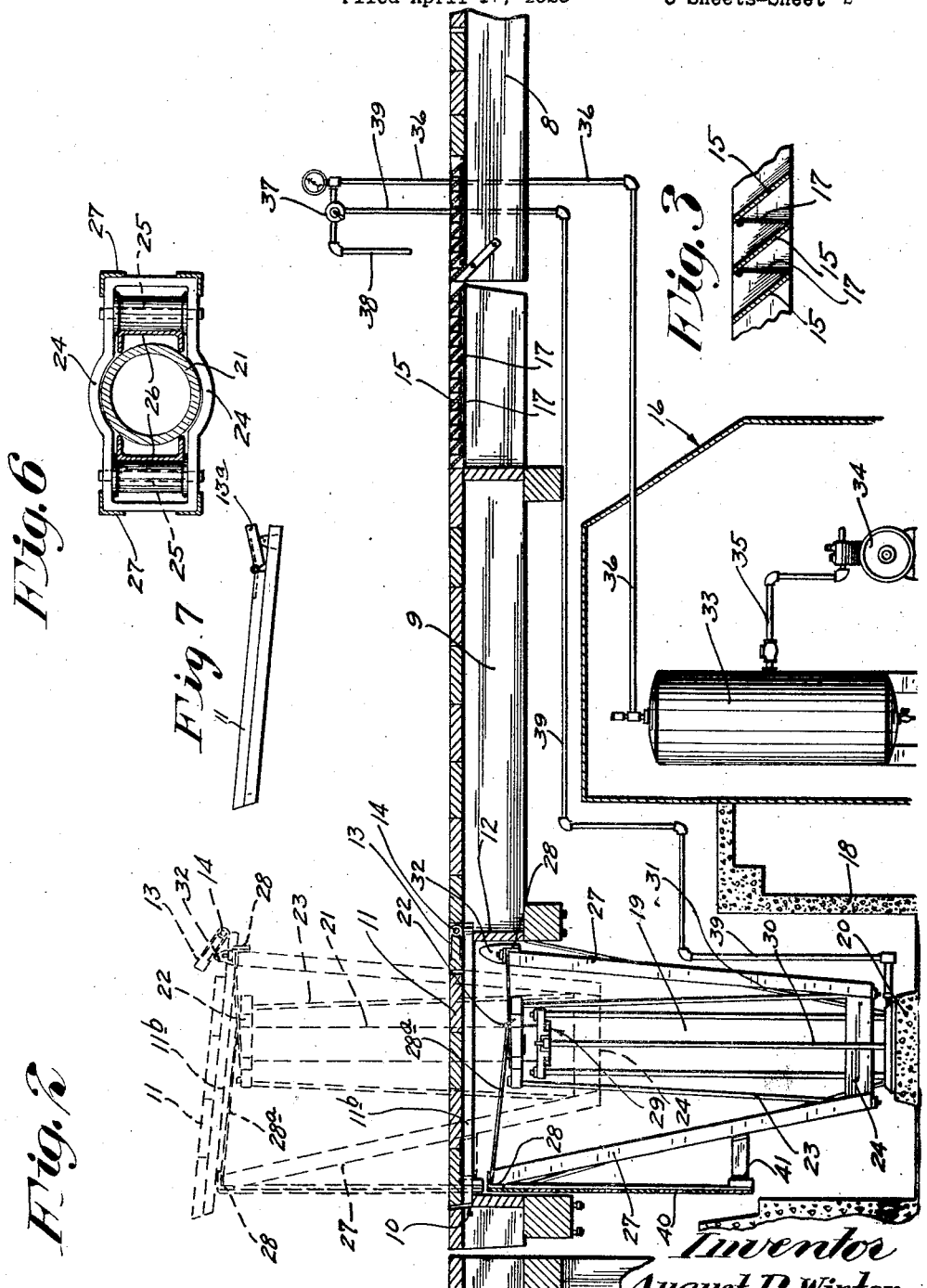

1,564,920

UNITED STATES PATENT OFFICE.

AUGUST P. WINTER, OF MINNEAPOLIS, MINNESOTA, ASSIGNOR TO SAMUEL C. CLOW, OF MINNEAPOLIS, MINNESOTA.

VEHICLE DUMP.

Application filed April 17, 1925. Serial No. 23,909.

*To all whom it may concern:*

Be it known that I, AUGUST P. WINTER, a citizen of the United States, residing at Minneapolis, in the county of Hennepin and State of Minnesota, have invented certain new and useful Improvements in Vehicle Dumps; and I do hereby declare the following to be a full, clear, and exact description of the invention, such as will enable others skilled in the art to which it appertains to make and use the same.

My invention relates generally to platform dumps of the type wherein a supplemental platform section is associated with power mechanism for lifting the same to tilt a vehicle into an inclined dumping position and, generally stated, the invention consists of the novel devices and combinations of devices hereinafter described and defined in the claims.

The invention involves highly important features, which particularly adapt the dump for use in connection with platform scales and for tilting into dumping positions vehicles of varying length and character, such, for example, as motor trucks and ordinary wagons, and sleighs.

In the accompanying drawings, I have illustrated a commercial embodiment of my invention, including what at present is considered the preferred form and arrangement of the several novel devices and combinations of devices. The important advantage of these novel features will be more readily understood after having first described the invention as illustrated in the drawings. In the said drawings, wherein like characters indicate like parts throughout the several views, Fig. 1 is a perspective showing the improved dump operative to tilt a motor truck into a dumping position;

Fig. 2 is a vertical longitudinal section taken at one side of the transverse center of the structure;

Fig. 3 is a fragmentary vertical section taken approximately on the line 3—3 of Fig. 1;

Fig. 4 is a plan view showing the vertically movable supplemental platform section and immediately adjacent portions of the scale platform;

Fig. 5 is a transverse vertical section taken approximately on the line 5—5 of Fig. 1, some parts being shown in full and some parts being broken away;

Fig. 6 is an enlarged horizontal section on the line 6—6 of Fig. 1, and

Fig. 7 is a fragmentary perspective illustrating a slight modification.

The numerals 7 and 8 indicate longitudinally spaced portions of a runway or fixed platform, between which is interposed a scale platform indicated as an entirety by the numeral 9. This scale platform may, of course, be supported in the customary way by standard or suitable scale mechanism. Near one end, the scale platform 9 has a large substantially rectangular opening 10 that is normally closed by a vertically movable supplemental platform section 11 made up of suitable plants and tie beams. When this supplemental platform section 11 is in normal position, it lies flush with the top of the platform 9 and is supported on a marginal bearing frame 12 formed as a part of said platform 9. For an important purpose, the platform section 11, at its inner edge, has a large notch or incut recess 11$^a$ that is normally closed by a projection 9$^a$ of the scale platform 9. In transverse line with the notch 11$^a$ and at each side thereof, the platform section 11 is provided with upwardly movable wings 13 connected to the tie-beams 11$^b$ thereof by suitable hinges 14. Normally, the wings 13 rest flatwise upon the beams 11$^b$, so that they are flush with the platform 9 and platform section 11.

The platform scale, at its end opposite to the opening 10, and the adjacent portion of the fixed platform 8 are provided with grain-discharge passages formed through a grate made up of oblique metal bars 15 that overlie a grain-receiving pit or hopper 16. To prevent the upward blowing of dust from the pit 16, light gravity-held curtain plates 17 are pivotally hung from the upper portions of the oblique grate bars 15. These curtain plates will freely move to permit the downward passage of grain but will keep the passages between the bars 15 closed so that dust will not rise through the same.

In the sub-structure below the supplemental platform section 11 is a pit 18 in which the lifting mechanism is mounted. This lifting mechanism includes a large upright cylinder 19 anchored at its lower end on a concrete base 20 or the like. Working within the cylinder 19 is a long piston 21 provided on its upper end with a load-carrying head 22 from which hanger rods or bars 23 are suspended. At their lower ends, the hanger rods 23 are attached to a yoke-like follower 24 that completely embraces the exterior of the cylinder 19 and is provided with diametrically opposite flanged guide rollers 25 that run against the vertical guide bars 26 shown as in the form of channel irons bolted or otherwise rigidly secured to the cylinder 19. Bolted or otherwise rigidly secured to the four corners of the follower yoke 24 and rising therefrom are upwardly diverging thrust bars 27, as shown steel angle bars, the upper ends of which are bolted or otherwise rigidly secured to parallel cross bars, which, in turn, are tied to the cylinder head 22 by oblique rods or straps 28$^a$. The follower 24 and bars 27, 28 and 28$^a$ constitute a sort of cradle suspended from the piston-carried head 22 and operative when raised to pick up and elevate the supplemental platform section 11. This cradle works closely to but with clearance from the side walls of the bearing frame 12. For an important purpose, presently to be noted, the inner or right-hand cradle bar 28 is set considerably lower than the outer or left-hand bar 28.

As shown, the cylinder 19, at its upper end, has a flanged head 29 and this head is tied and anchored to the lower cylinder head by long vertical anchor bolts 30. Also, as shown, the cylinder head 29 is anchored to the sides of the pit 18 by oblique rods 31 that serve to keep the cylinder in true vertical position and its upper end properly centered.

The inner or right-hand bar 28 of the platform-lifting cradle is provided with upstanding lift lugs 32 that work through openings in the platform section 11 between the tie-bars 11$^a$, (see particularly Fig. 5); and are engageable with the platform wings 13 to lift the latter into oblique positions when the lifting mechanism is operated to raise the supplemental platform section 11, as shown by dotted lines in Fig. 2.

The lifting motor made up of the cylinder 19 and piston 21, is arranged to be operated by compressed air, and in the system illustrated, I have shown an air storage tank 33 that is supplied with air from an air compressor 34 through a pipe 35. An air pipe 36 extends from the tank 33 to a three-way valve 37 of the usual or any suitable construction. From the valve 37, a short air exhaust pipe 38 extends to the atmosphere, and also from said valve there is extended a long air pipe 39 that is connected for the delivery of air into the lower end of the cylinder 19. Obviously, by manipulation of the three-way valve 37, the storage tank 33 can be connected to the cylinder 19 for the delivery of air to the latter to raise the piston 21, or said cylinder may be connected to the pipe 38 and, hence, for discharged to the atmosphere, so as to permit the piston 21 to lower. Also, of course, said valve 37 may be set in a neutral position, after the manner of ordinary three-way valves, so as to cage the air in the cylinder 29 and thereby hold the piston 21 in any desired elevation.

To the outer or left-hand side of the cradle, made up of the elements 24, 27, 28 and 28$^a$, is attached an upright board or plate that serves as a horse guard. This horse guard 40 is shown as bolted or otherwise rigidly secured to the outer or left-hand angle bar 28 at its upper end and at its lower end is tied to the outer or left-hand thrust bars 27 by tie-brackets 41. When the supplemental platform 11 is elevated by upward movement of the cradle and piston of the lifting motor, this horse guard 40 prevents horses, hitched to wagons that are being dumped, from backing into the opening under the elevated supplemental platform section.

Operation.

In Fig. 2, the normal positions of the parts are indicated in full lines and here it is important to note that, when the piston 21 and the platform-lifting cradle carried thereby is lowered, it is entirely out of contact with the scale platform 9 and with the supplemental platform section 11, so that the weighing action is not in any way interfered with or effected by the dump-lifting mechanism. Otherwise stated, normally the lifting mechanism is entirely disconnected from the scale platform and its supplemental dumping section.

In practice, it has been found that trucks, which carry the greater part of their load on their rear wheels, will not tend to run or travel even when their front wheels are elevated to a considerable height so as to dump a load of grain or other material from the rear end of the truck body. On the contrary, it has been found that wagons, which carry the load quite well distributed on their four wheels, will, when tilted backward into dumping positions, tend to travel or roll backward. The device already described admirably takes care of these conditions.

When the load from a truck is to be dumped, the front wheels of the truck are run well onto the supplemental platform section 11, so as to bring the rear end of the truck body over the grate 15 and then the truck is raised at its front end and tilted into a dumping position, as shown in Fig. 1, by lifting of the suplemental platform section 11. To lift the supplemental section 11, air will be introduced into the lower end of the cylinder 19, which causes the piston 21 to rise. This piston, as already noted, acts through the hanger bars or rods 23 to elevate the cradle made up of the follower 24, thrust bars 27, and other elements noted. The said cradle is thus lifted from its lower end and the lifting force is distributed through the front and rear bars 28. When the said cradle is thus lifted, its front or left-hand bar 28 first comes into contact with the outer or left-hand portion of the supplemental platform section 11 and a little later the inner or right-hand bar 28 comes into contact with the beams 11^b of said platform section. Before the right-hand bar 28 engages said supplemental platform section, as just stated, the several lifting lugs 32 come into engagement with the two sections 13 and raise the free inner edges thereof above the upper surface of the platform section 11. The result of these actions is that, when the supplemental platform section 11 has been picked up by the cradle and elevated, it will be in an oblique position, inclining toward the right or toward the dumping end of the vehicle, and the wings 13 will be raised so that they will afford stops that positively prevent the raised front wheels of a wagon from running backward beyond their points of engagement with said wings. The inclination of the platform tends to cause the raised front wheels of the wagon to run against the stop-acting wings 13 so that the rear end of the wagon will be positioned to discharge through the grate 15 and into the pit 16. Of course, a wagon being shorter than a truck, its front wheels will stand as far back as they can run on the elevated platform. The elevated front wheels of a truck, however, will remain where they are primarily set, further forward on the elevated platform, as shown in Fig. 1. Here it should be noted that when the truck is elevated, as shown in Fig. 1, the case of its transmission mechanism will find clearance in the space 11^a formed between the wings 13; whereas, if this clearance space were not provided, said case would be engaged either by the wings or by the raised platform section and something would be broken.

Oscillation or rotation of the raised supplemental platform section and the cradle on which it is then supported, will be prevented by the horse guard or plate 40, which is of such width that it will not move edgewise to any material extent in the space afforded within the bearing frame 12. Oscillation of the said parts is also limited by engagement of the flange rollers 25 with the guide bars 26, but the said horse guard is relied on chiefly because of its increased distance from the axis of the cylinder and piston. The chief function of the rollers 25 is, therefore, to reduce friction and to take side thrusts put upon the platform-lifting cradle when under load.

Of course, when the lower end of the cylinder is open to exhaust, the piston-lifting cradle, supplemental platform and front end of the truck or wagon will, under the action of gravity, be moved downward and backward to normal position under a speed that may be controlled by adjustments of the three-way valve 37. The details of said three-way valve are not here illustrated, because the construction and operation of three-way valves is well known and any of the many suitable types of three-way valves may be here employed and operated in the customary way.

Certain features of this invention are directed particularly to and are highly important in connection with the use of the invention in connection with platform scales, but some of the features may, nevertheless, be incorporated in more general applications, regardless of whether or not they are associated with the platform or weighing scales.

When the platform 11 or its cage is used in connection with the platform scale, it becomes a supplemental platform section; but in other applications it will operate simply as an elevating platform, and this latter expression is herein used as a generic term therefor.

In Fig. 7 the hinged stop wing 13^a is hinged to the platform section 11 at its inner edge instead of at its outer edge; but otherwise the construction is the same as previously described.

What I claim is:

1. In a vehicle-dumping device, a vertically movable elevating platform and a normal support therefor, in combination with a power-actuated platform-lifting device normally below and inoperative on said platform but movable vertically to pick up said platform bodily and to raise the same to a vehicle-dumping position.

2. In a vehicle-dumping device, a vertically movable elevating platform and a normal support therefor, in combination with a power-actuated platform-lifting device normally below and inoperative on said platform but movable vertically to pick up said platform bodily and to raise the same to a vehicle-dumping position, said platform having vertically movable wheel-stopping elements and said lifting device having elements engageable with said wheel-stopping elements to raise the same above said platform when the latter is raised by said lifting device.

3. The structure defined in claim 2 in which said wheel-stopping elements are hinged wings movable into oblique positions when raised.

4. The structure defined in claim 2 in which said wheel-stopping elements are laterally spaced hinged wings with a clearance space between the same and are movable into oblique positions when raised.

5. The structure defined in claim 2 in which said wheel-stopping elements are hinged wings movable into oblique positions when raised, inclining toward the lower dumping end of the vehicle.

6. The combination with a scale platform having a vertically displaceable supplemental dumping platform section normally seated thereon, of a power-actuated lifting device below said supplemental platform section, normally inactive on the latter but operative to pick up and lift the same from said scale platform to dump a load.

7. In a vehicle-dumping device, a vertically movable elevating platform and a normal support therefor, in combination with a cylinder anchored below said platform, a piston working in said cylinder, and a platform-lifting device carried by said piston, normally out of connection with said platform but movable to pick up and elevate the same bodily and to thereby move the vehicle into a load-dumping position.

8. The structure defined in claim 7 in which said supplemental platform is provided with vertically movable wheel stops and said lifting device is provided with projections engageable therewith to raise the same above said platform when the latter is raised.

9. In a vehicle-dumping device, a vertically movable elevating platform and a normal support therefor, in combination with a cylinder anchored below said platform, a piston working in said cylinder, means for controlling a motive fluid to operate said piston, a lifting cradle guided at its lower end by said cylinder, and hangers connecting the lower portion of said cradle to the upper portion of said piston, the upper portion of said cradle being normally out of engagement with said platform but arranged to pick up said platform and raise the same bodily when said piston is raised.

10. The structure defined in claim 1 in which said platform assumes an inclined position when raised.

11. The structure defined in claim 6 in which said supplemental platform assumes an inclined position when raised and is provided with wheel stops arranged to be lifted to operative positions at the lower edge of the raised and inclined platform.

12. The structure defined in claim 6 in which said platform is provided with a depending horse guard which when raised holds the same against rotation on a vertical axis.

13. The combination with a scale platform having a vertically displaceable supplemental dumping platform section normally seated thereon, of a cylinder below said dumping platform, a piston working in said cylinder, means for controlling the motive fluid to raise and lower said piston, a follower surrounding and guided by said cylinder, hanger rods connecting said follower to the upper portion of said piston, inner and outer pairs of thrust bars connected to said follower at their lower ends and rising therefrom, inner and outer cross bars connecting the upper ends of the inner and outer thrust bars, means tying the upper ends of said thrust bars against spreading movements in respect to the upper end of said piston, said cross bars being engageable with said dumping platform to lift the same.

14. The combination with a scale platform having a vertically displaceable supplemental dumping platform section normally seated thereon, of a cylinder below said dumping platform, a piston working in said cylinder, means for controlling the motive fluid to raise and lower said piston, a follower surrounding and guided by said cylinder, hanger rods connecting said follower to the upper portion of said piston, inner and outer pairs of thrust bars connected to said follower at their lower ends and rising therefrom, inner and outer cross bars connecting the upper ends of the inner and outer thrust bars, means tying the upper ends of said thrust bars against spreading movements in respect to the upper end of said piston, said cross bars being engageable with said dumping platform to lift the same, said dumping platform having hinged wings affording wheel stops and the inner of said cross bars having lugs engageable with said wings to lift the same to operative positions when said supplemental platform is raised to a load dumping position.

In testimony whereof I affix my signature.

AUGUST P. WINTER.